UNITED STATES PATENT OFFICE.

ROBERTS BARTHOLOW, OF CINCINNATI, OHIO.

IMPROVEMENT IN THE MANUFACTURE OF BLACKING, &c.

Specification forming part of Letters Patent No. 47,082, dated April 4, 1865.

*To all whom it may concern:*

Be it known that I, ROBERTS BARTHOLOW, of Cincinnati, in the county of Hamilton, in the State of Ohio, have invented a new and improved mode of manufacturing oil blacking for leather, boots, shoes, harness, and other articles manufactured (in whole or in part) of leather; and I do hereby declare that the following is a full and exact description thereof, reference being had to the accompanying specimens, and to the letters and figures of reference marked thereon.

The nature of my invention consists in manufacturing, compounding, and preparing a new and improved kind of oil-blacking for leather, boots, shoes, harness, and other articles manufactured (in whole or in part) of leather, from the following articles, viz: crude petroleum, sulphuric acid, pyroligneous acid, gum-arabic, bone-black, wheaten flour, and molasses, compounded together in the proportions and in the manner hereinafter at large specified.

To enable others skilled in the art to make and use my invention, I will proceed to describe the method of its manufacture and preparation.

I take twelve (12) ounces of crude petroleum and add thereto four (4) ounces of common sulphuric acid. I then apply heat to the mixture, and as soon as the petroleum becomes carbonized or blackened I add four (4) ounces of bone-black to the preparation, and, still continuing the application of the heat, I stir the same until the ingredients are thoroughly incorporated together; or the above-named amounts of petroleum and bone-black may be mixed together first, and subsequently the above-named amount of sulphuric acid may be added to the mixture, and then the heat may be applied and continued and the mixture constantly stirred until the ingredients are thoroughly incorporated together. As the mixture (prepared by either of the above processes) cools I add two (2) ounces of pyroligneous acid, two (2) ounces of wheaten flour, six (6) ounces of common molasses, and one ounce of gum-arabic in a powdered state, and stir the compound thus formed until all of the ingredients are thoroughly incorporated together.

The relative quantities of the various ingredients may be somewhat varied from the above formula without materially affecting the result, and when it is desirable to produce a hard and firm blacking I increase the quantities of bone-black, flour, gum-arabic and molasses until the desired consistency is obtained; and when it is desirable to produce the blacking in a more liquid, as well as more economical, form I use a diminished quantity of the four last-named articles, using sufficient only in quantity to produce the desired consistency. The article of flour may be omitted or diminished, provided an additional quantity of bone-black equal in bulk thereto is added in lieu thereof. Acetic acid or good strong unadulterated vinegar may be substituted in the same proportions for the pyroligneous acid. The quantities of the respective ingredients first herein named are indicated in order to give the relative proportions, but any multiples thereof may be employed.

I do not restrict myself to the use of the ingredients given for forming the body of the blacking, since other equivalent oxides and gums may be substituted for those specified, and for bone-black any other equivalent black may be used.

What I claim as my invention, and desire to secure by Letters Patent, is—

1. The manufacture, compounding, and preparation of a new and improved kind of oil-blacking for leather, boots, shoes, harness, and other articles manufactured (in whole or in part) of leather, composed of the ingredients above named, and manufactured, compounded and prepared in the manner and for the purposes substantially as set forth at large above.

2. As a new manufacture, oil-blacking for leather and other articles, made by combining petroleum or any of its products, or other hydrocarbon oils, treated substantially as hereinbefore set forth, with any suitable acids, oxides, gums, or resins, substantially in the manner specified.

ROBERTS BARTHOLOW.

Witnesses:
I. S. DODGE,
J. B. CONKLIN.